United States Patent [19]
Marks et al.

[11] Patent Number: 4,881,446
[45] Date of Patent: Nov. 21, 1989

[54] SPACE TRAIN

[76] Inventors: Alvin M. Marks, Bigelow Rd., Athol, Mass. 01331; Peter H. Diamandis, Box 153, Mit Br P.O., Cambridge, Mass. 02139

[21] Appl. No.: 187,246

[22] Filed: Jul. 28, 1988

[51] Int. Cl.$^4$ ............................. B64F 1/04; F41F 1/02
[52] U.S. Cl. ........................................ 89/8; 104/138.1; 104/292; 244/63
[58] Field of Search .................... 89/1.1, 1.11, 1.816, 89/8; 124/3; 104/138.1, 281, 282, 290, 292; 244/3 R, 62, 63, 158 R; 310/10, 11, 12, 13, 14; 52/169.6, 169.7, 169.8

[56] References Cited

U.S. PATENT DOCUMENTS

| | | | |
|---|---|---|---|
| 3,565,011 | 2/1971 | Edwards | 104/138.1 |
| 4,709,883 | 12/1987 | Giuliani et al. | 104/290 |
| 4,791,850 | 12/1988 | Minovitch | 89/8 |
| 4,795,113 | 1/1989 | Minovitch | 104/138.1 |

FOREIGN PATENT DOCUMENTS 3426452 1/1986 Fed. Rep. of Germany ..... 89/1.816

OTHER PUBLICATIONS

Clarke, Arthur C., "Electromagnetic Launching as a Major Contribution to Space-Flight", J. of British Interplanetary Society, vol. 9, No. 6, Nov. 1950, pp. 261–267.
Lemke, E. H., "Magnetic Acceleration of Interstellar Probes", J. of the British Interplanetary Society, vol. 35, pp. 498–503, 1982.
Kolm et al., "An Alternative Lauching Medium", IEEE Advanced Technology, 1982, pp. 30–36.

*Primary Examiner*—Stephen C. Bentley

[57] ABSTRACT

The direct projection of a space vehicle, herein termed a "Space Train TM", into space without combustile fuel is described. A mathematical physics analysis derives critical ranges of parameters, which inlcude a vehicle having a mass of about 3,000,000 Kg., a length of about 180 m and 5 m dia.; an acceleration of about 8 g's during its travel within 1000 km of a vacuum tube parallel to Earth's surface to a velocity of about 12 km/sec., the vehicle exiting from the tube into the atmosphere at an angle of about 3° and an elevation of about 3 km at a maximum deceleration of about 8 g's. An acceleration or deceleration of 8 g's is tolerable to humans in the special chair described herein. The energy imparted to this mass is provided by a conventional electric power source stored as electric energy in superconducting storage inductor rings. The electric energy is discharged to coils around the vacuum tube just in advance of the center of the moving vehicle. A solar electric powered mass thrustor is also described. The Space Train TM will decrease the cost of transportation into space by a factor of at least 100; opening the Space Frontier on a cost-efficient, profitable, reliable and safe basis.

13 Claims, 8 Drawing Sheets

FIG. 7
"GEOMETRY FINAL LAUNCH TUBE SECTION"

FIG. 8
"SPACE TRAIN ORBITAL DYNAMICS"

FIG. 9
EXIT VELOCITY KM/S Vs. MASS KG ×10⁶

FIG. 13
ACCELERATION Vs. TIME
($G_x$'S ×9.82 m²/s)

FIG. 12
VELOCITY Vs. TIME

FIG. 14

SPACE TRAIN

This invention relates to a Space Train ™, and to a System for projecting it into space at a velocity enabling its escape from the gravitational field of the Earth, without the use of combustible fuels, and with an acceleration and deceleration tolerable to humans. An object of this invention is to provide an alternate source of lift-off energy for space vehicles to obviate the need for using large quantities of dangerous combustible fuel in proximity to passengers and cargo; and in particular, to avoid another tragedy such as the explosion and destruction of Flight 51-L of the Space Shuttle "Challenger" and its crew; and many other failures which destroyed unmanned rockets carrying valuable cargo. The System comprises an almost horizontal tube; for example, about 1000 km long and about 5 m inside diameter. To enable the Train to travel in the Tube with little loss of energy to air, the Tube is maintained at an air pressure of less than 1 millibar. The Tube is provided with an electromagnetic drive to accelerate the Train. Electric energy from an external source may be stored over a long period, and quickly discharged to coils along the tube to drive the Space Train ™ to exit velocity.

The Space train comprises a hollow cylindrical mass of at least 3,000,000 Kg; for example, 180 m long and 5 m in Diameter. The forward and rear ends of the vehicle are conically shaped with a apex angle of about 10° to minimize air friction. The Train is driven with a constant acceleration of about 8 g's, the maximum acceleration comfortably tolerable to humans. The exit velocity of the Space Train from the Tube into the atmosphere is about 12 km/sec.

A Train of such large mass can carry everything needed to construct a permanent Spaceport, or constitute an Interplanetary Space Train ™.

An advantage of the Space train ™ System of this invention is that it may be launched without the use of energy from combustible fuel; thus avoiding the danger of explosion, increasing launch reliability, and decreasing launch costs.

A further advantage of this invention is the great mass and size of the Space Train ™, enabling the inclusion of much cargo, including solar-electric panels for a large Solar-Electric Power source, expendable mass for a mass-driver, electric powered Thrustor, ample crew and passenger quarters, and facilities and provisions for a long stay in space.

A further advantage of this invention is the provision of acceleration and deceleration phases at less than 8 g's for a small time, which may be comfortably tolerated by humans on board as crew and passengers.

A further advantage of the Space Train ™ of this invention is that the walls may be sufficiently thick to protect against Solar Flares or other deleterious Space radiation.

Another advantage of the Space Train ™ of this invention is that it may be configured to be separated and reassembled in space for use as a permanent Spaceport, or as a cycling Interplanetary Space Train. It may carry onboard one or more smaller vehicles which may be dispatched to Earth, Mars or other space body.

Still another advantage of the Space train ™ is that it will decrease the cost of transportation into space by greater than an order of magnitude, opening up the Space Frontier on a cost-efficient, profitable, reliable and safe basis.

These and other advantages and objects, and various other aspects of this invention, will become apparent from the description which follows.

THE PRIOR ART

An excellent review of the current State of the Art, including a bibliography, and "An Exciting Vision of our next Fifty Years in Space" has been presented in the 1986 REPORT OF THE NATIONAL COMMISSION ON SPACE [1]. Present or proposed Space vehicles are launched into space by rockets using chemical propellants [1.1]. Solar-Electric Panels are required to power space ships, but present photovoltaic devices are too inefficient, too expensive, and require too much area to provide for large power requirements [1.2]. The invention of an efficient solar-electric panel with a 60–80% efficiency is described in a recent patent issued to Alvin M. Marks [2], and in a copending patent application [3]: Ser. No. 06/637,405 filed Aug. 3, 1984, entitled Femto Diode and Applications, issued to Alvin M. Marks as U.S. Pat. No. 4,720,642 on Jan. 19, 1988.

Electric propulsion using mass drivers for space ships has been proposed [1.3]. Electromagnetic mass-drivers to catapult materials from the surface of the Moon into space have been proposed, and laboratory work on Earth has shown high accelerations to be feasible [1.4]. Earlier work by Alvin M. Marks [4], and others [5], described the charging of small particles useful for mass-driver electric propulsion systems for space vehicles. Superconductive Electromagnetic Storage Systems to store and rapidly discharge large quantities of electric energy have been described, built and successfully tested [6].

In about 1865, Jules Verne, in a prescient science fiction novel [7] remarkable for its time, told about a projectile carrying 3 humans to the Moon and return. The projectile was supposed to issue from a vertical cannon in a 270 m deep shaft sunk into the Earth, propelled by an explosive charge of pyroxylin (gun cotton) to an exit velocity of about 12 km/sec. Unfortunately, the acceleration would have been 27,000 g's fatal to a human.

Recently, 116 years later, H. Kolm, et al [8,9] proposed a 7.8 km long tube along the slope of a mountain and an electromagnetic drive to propel a projectile carrying a non-human cargo having a mass of 15,000 kg into space. The projectile was 1.2 m dia. The acceleration phase was at 1000 g's which would be fatal to a human. The propulsion device replaced the first rocket stage only; it was necessary to carry aloft combustible fuel for a second stage rocket to propel the vehicle into orbit. The problem of projecting humans into space safely without a combustible fuel driven rocket was not solved.

Electromagnetic drivers for use on materials and vehicles travelling at large velocities have been proposed and may be adapted for use in this invention [1.4, 10]. Similar drives have been employed at atmospheric pressure for passenger trains travelling on the Earth's surface at 400 km/hr. (0.11 km/s), commercially known as "Maglev" trains [11,12].

Recent studies have shown that the maximum acceleration that is safely tolerated by a human is 12 g [13,14].

BACKGROUND OF THE INVENTION

The first conception of a Space Train TM, suitable for humans and cargo, accelerated at low g in a long, almost horizontal vacuum tube on Earth, and directly projected into space without combustible fuel was by Alvin M. Marks. At his request, a mathematical physics analysis was made by Peter H. Diamandis, one of the Inventors hereof. Under the constraint of a maximum acceleration or deceleration of 8 g's, new and unexpected ranges of parameters were discovered, enabling the selection of optimum values of Tube length, Space Train TM mass, dimensions, exit velocity angle and height.

The mass and exit velocity of the Space Train TM from the Tube overcomes the drag of the atmosphere, and enables its escape from the gravitational field of the Earth. The mathematical physics and calculations determine Space Train TM mass, velocity vs. time, acceleration and deceleration vs. time, exit angle, height, trajectory and electric drive power. The requisite mass of the Space Train TM is large: about 3,000,000 kg.

Alvin M. Marks proposed utilizing the large mass of the Space Train TM to carry everything needed for its conversion in space into a Spaceport or an Interplanetary Space Train TM. If $10^5$-$1$ $m^2$ Lepcon TM light-electric power converting panels are carried as cargo, and assembled in space, 100 Mw Electric Power is available at Earth-Sun distance ($1.5 \times 10^{11}$ m). This power may be used for propulsion of the Interplanetary Space Train TM; and for other requirements. Propulsion is provided by an electrically powered mass-driver Thrustor which expels electrically accelerated charged submicron particles.

CROSS REFERENCE TO RELATED PATENTS AND PATENT APPLICATIONS

The solar-electric power source proposed utilizing the light-electric power converting panels Lepcon TM described in U.S. Pat. No. 4,445,050 issued to Alvin M. Marks, Apr. 3, 1984, entitled: "DEVICE FOR THE CONVERSION OF LIGHT POWER TO ELECTRIC POWER"; and co-pending application Ser. No. 637,405, filed Aug. 3, 1984, entitled: "FEMTO DIODE AND APPLICATIONS" now issued to Alvin M. Marks as U.S. Pat. No. 4,720,642, Jan. 19, 1988. Methods of charging liquid droplets are described in U.S. Pat. No. 4,206,396 issued to Alvin M. Marks on June 30, 1980 entitled: "CHARGED AEROSOL ELECTRIC GENERATOR WITH UNI-ELECTRODE SOURCE". The present application is related to Ser. No. 886,568, filed July 17, 1986, now abandoned, entitled "Space Train TM, invented by Alvin M. Marks and Peter H. Diamandis.

SUMMARY OF THE INVENTION

The Space Train TM and its Launching System according to this invention comprises:

1. A horizontal Tube about 1000 km long and about 5 m inside diameter. The Tube is maintained at a vacuum such that there is little loss of energy from the Train to the residual air. Double door air locks at each end open and close as the Train passes.

2. The Train comprises a cylindrical mass of about 3,000,000 Kg; for example 180 m long and 5 m diameter. To minimize air friction, the forward and rear ends of the Train are conically shaped at an apex angle about 10°. The Train reaches exit velocity by a constant acceleration of about 8 g's; tolerable to humans. The exit velocity of the Train from the tube into the atmosphere is about 12 km/sec. at, for example, 3° and 3 km height. A momentary deceleration is a maximum of 8 g's.

3. The Train is propelled by an electromagnetic drive along the tube.

4. An external electric power source of about 10,000 Mw is maintained on line for about 24 hours for each launch, to supply large quantities of electric energy to a plurality of storage devices located in depots along the Tube. The storage devices may be inductors or capacitors at ambient temperature, or superconducting rings. These are discharged quickly to deliver momentary high power pulses to drive the Train.

5. Electrical devices and controls are provided to transfer the electric power from the storage devices to the electromagnetic drives along the tube; to open and close doors, vacuum and air valves, and to control all devices employed during the launch.

MATHEMATICAL PHYSICS ANALYSIS

There follows the mathematical physics analysis which established the parameters for the projection of a Space Train TM directly from the surface of the Earth at its Escape Velocity, at an acceleration and deceleration safely tolerable by humans:

TABLE OF SYMBOLS $F_D$ = Force due to drag (NEWTONS)
$\rho$ = Density of local atmosphere (kg/m³)
$\rho_0$ = Density of atmosphere at sea level = 1.226 (kg/m³) at 288° K. or about 15° C. at 1 atm
$\rho_s$ = Space Train average density
K = Gas Constant = 0.287 (m²/°ksec²)
V = Velocity (m/s)
$V_e$ = Exit Velocity (from launch tube) (m/s)
$C_d$ = Coefficient of drag
r = Radius of Space Train (m)
L = Length of Space Train (m)
$z_c$ = Length of front and back cones of Space Train (m)
$z_b$ = Length of center tubular section of Space Train (m)
$\delta$ = Angle of Space Train cone (front and rear)
M = Mass of Space Train
D = Distance traveled (m)
t = time (sec.)
$\epsilon$ = Efficiency
E = Energy (Joules)
P = Power (Joules/sec.)
$\alpha$ = Angle of Velocity vector with the Tangent to the Earth directly below (degrees)
A = Cross-sectional area of Space Train (m²)
a = Acceleration or deceleration experienced by Space Train (m/s²)
$\bar{a}$ = Average acceleration or deceleration experienced by Space Train (m/s²)
$a_c$ = Centripetal Acceleration experienced by Space Train (m/s²)
$a_v$ = Acceleration normal to the path of the launch tube
$R_e$ = Radius of Earth = 6,370,000 m
$R_i$ = Local radius of curvature (m)
X = Distance from Space Train to the surface of the Earth
H = Final height of launch tube (at exit) (m)
h = Distance of Space Train from the center of the Earth
y = Projected length of final launch tube arc onto the Earth (m)
$\phi$ = Downrange angle (relative to launch point) (rad)
g = Local gravity (m/s²)
$g_o$ = Gravity at sea level = 9.82 (m/s²)
$R_c$ = Instantaneous radius of curvature (m)
$\theta = \phi - \alpha$
$\lambda$ = Lapse rate = 0.0065 degrees/meter (for h < 10,000 meters)
$T_o$ = Temperature at sea level = 288.15 deg. kelvin
$T_s$ = Temperature in stratosphere = 216.65 deg. kelvin

SUBSCRIPTS a = Build-up phase
b = Boost phase
c = Build-down phase
d = Glide phase
e = Atmospheric Compensation Phase
t = Total

MATHEMATICAL PHYSICS

I. LAUNCH TUBE EQUATIONS OF MOTION $$D = V_o t + 0.5\, at^2 \quad (1)$$

$$V = V_o + at \quad (2)$$

$$\bar{a} = (a_i + a_f)/2 \quad (3)$$

$$E = 0.5 M (V_f - V_i)^2 / \epsilon \quad (4)$$

$$P = E/t \quad (5)$$

$$F_d = (0.5)\rho V^2 C_d A \quad (6)$$

EXAMPLE

M = 3,250,000 kg
$V_e$ = 11,800 m/s
H = 3,000 m
$\alpha$ = 3 degrees
$\epsilon$ = 0.7

(A) Build-up phase (Linear increase in acceleration from 0 to 78.6 m/s² over 10 seconds).
From (3):
$\bar{a} = (78.6 + 0)/2 = 39.3$ m/s²
From (2):
$V_c = 11,872.7 + (-39.3)(3) = 11,754.8$ m/s
From (1)
$D_c = 11,872.7\ (3) + (0.5)(-39.3)^2 = 35,400$ m = 35.4 km (B) Boost phase (Accelerate to 11,872.7 m/s at a rate of 78.6 m/s²).
From (2):
$V_b = 11,872.7 = (393) + (78.6)(t_b)$  $t_b = 146.05$ seconds
From (1):
$D_b = (393)(146.05) + (0.5)(78.6)(146.05)^2 = 895.7$ km (C) Build-down phase (Reduces acceleration from 78.6 m/s² to 0 m/s² over 3 sec.)
From (3):
$\bar{a} = (78.6 + 0)/2 = 39.3$ m/s²
From (2):
$V_c = (11,872.7) + (39.3)(3)^2 = 12,226.4$ m/s = 12.2 km/s
From (1):
$D_c = (11,872.7.3)(3) + (0.5)(39.3)(3)^2 = 35.8$ km (D) Glide phase (Speed maintained constant at 11.8 km/s for 3 seconds).
From (1):
$D_d = (11,990.6)(3) = 36.0$ km (E) Atmospheric Compensation Phase (final section of tube filled with atmosphere over a 5 second period while Space Train Velocity maintained at 11.8 km/second).
From (6):
Initial $F_d = (0.5)(0)(11,800)(0.2)(19.64) = 0$ Newtons
Final $F_d = (0.5)(0.906)(11,800)(0.2)(19.64) = 2.477 \times 10^8$ Newtons.
Average $F_d = (0 + 2.477 \times 10)/2 = 1.239 \times 10^8$ Newtons
$a = F_d / M = 1.239 \times 10^8 / 3,250,000 = -38.12$ m/s²
From (2):
$V_e = 11,990.6 + (-38.12)(5) = 11,800$
From (1):
$D_e = (11,990.6)(5) + 0.5(-38.12)(5)^2 = 59.5$ km (F) Total Parameters of Acceleration Phase
$t_t = t_a + t_b + t_c + t_d + t_e = 10 + 146.05 + 3 + 3 + 5 = 167.05$ sec.
$D_t = D_a + D_b + D_c + D_d + D_e = 1.965 + 895.7 + 35.8 + 36.0 + 59.5 = 1,028.9$ km (643 miles)

(G) Estimation of required Energy and Power
From (4):
$E_t = [(0.5) \times 3,250,000 \times (11,990 - 0)^2] / 0.7 = 3.337 \times 10^{14}$ Joules From (5):

$P_t = E_t/t_t = 3.337*10^{14}$ Joules$/167.05 = 1.998*10^{12} = 2,000,000$ MW

II. FINAL CURVATURE OF LAUNCH TUBE NEEDED TO ACHIEVE $\alpha=3$ DEGREES (See FIG. 7)

Radius of curvature limited by centripetal acceleration ($a_c < 39.3$ m/s$^2$):

$$R_i = > V^{2/a}c \quad (7)$$

$$y = \sim SQR\{(R_e + H)^2 - (R_e)^2\} \quad (8)$$

$$= \sim y/R_i \quad (9)$$

$$y = \sim SQR\{(R_e+H)^2-(R_e)^2\} \quad (8)$$

$$= \sim y/R_i \quad (9)$$

Example

H = 3000 meters
$a_c = 64$ m/s$^2$
From (7):
$R_i = > (11,800)^2/64 = > 2,175$ km
From (8):
$y = SQR\{(2175+3)^2-(2175)^2\} = 114.3$ km
From (9):
$= 114.3/2175 = 0.053$ rad $= 3.01$ degrees

Figure 10:
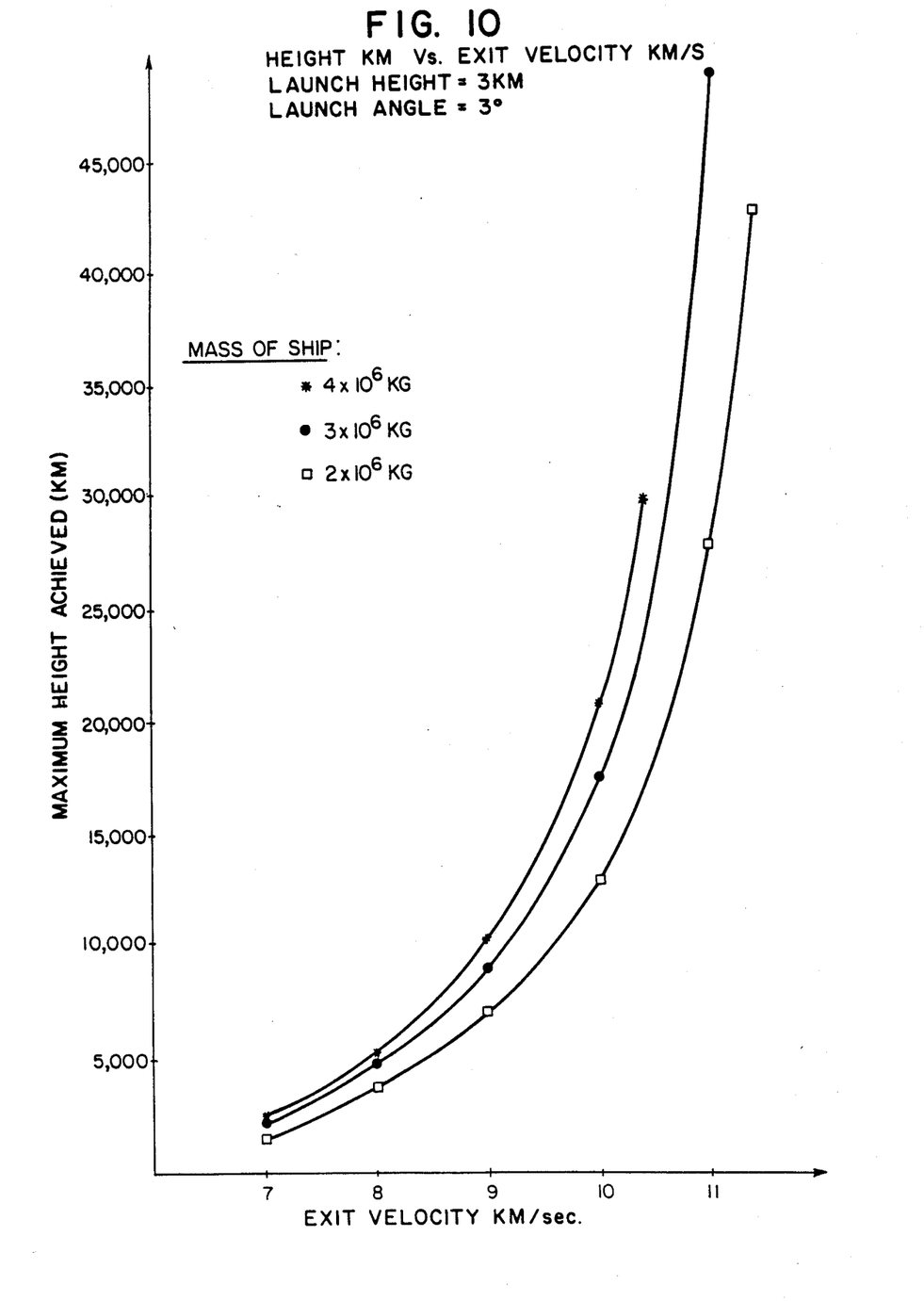
FIG. 10 shows graphs of Height(Km) achieved versus Exit Velocity Km/s, for various constant Ship Masses: 2,3, and $4 \times 10^6$ Kg.
Figure 11:
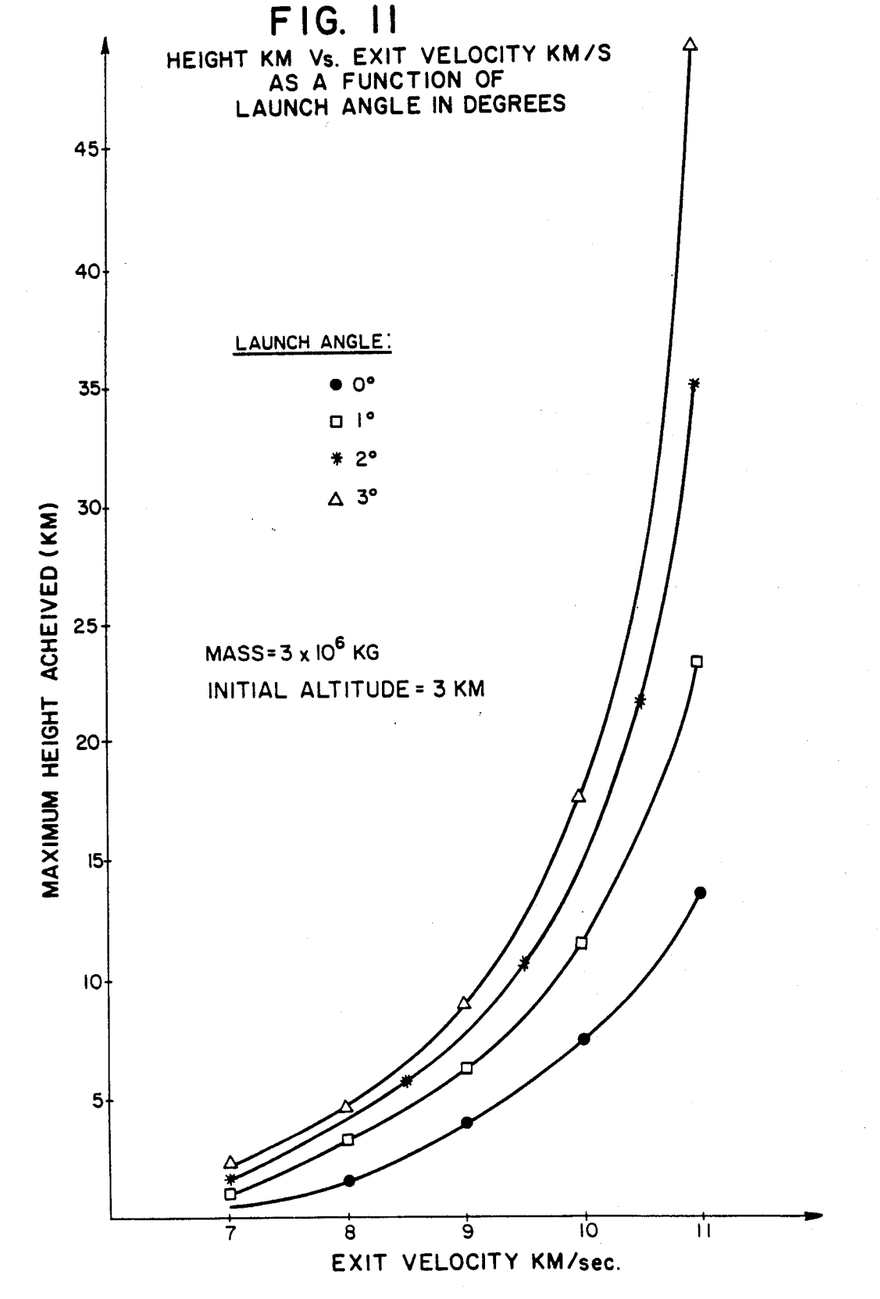
FIG. 11 shows Height km versus Exit Velocity Km/s for a constant Ship Mass of $3 \times 10^6$ Kg, for Launch Angles of 0°, 1°, 2°, and 3°.

III. SPACE TRAIN MASS-EXIT VELOCITY RELATIONSHIP REQUIRED FOR AN INITIAL ATMOSPHERIC DECELERATION OF LESS THAN 8 GRAVITIES (FIG. 10)

$$a = F_d/M \quad (10)$$

From (6):

$$a = [(0.5)\rho V^2 C_d A]/M \quad (11)$$

Example $\rho = 0.905$ kg/m$^3$ (at H=3 km)
$C_d = 0.2$
A = 19.64 (r=2.5 m)
From (11):

$$78.6 = (0.5)(0.906)(V^2)(0.2)(19.6)/M$$
$$Vel = SQR[(44.3)(M)] \quad (12)$$

IV. ACCELERATION NORMAL TO THE PATH OF THE LAUNCH TUBE $$a_y = (g - a_c) \quad (13)$$

$$a_y = (9.82 - (V^2/R_i))\text{m/s}^2 \quad (14)$$

Example $R_i = R_e = 6370$ km (for $t<157.05$ sec.) (Earth curvature)
$R_i = 2175$ km (for $154.63 < t < 167.05$ sec.) (Final tube section curvature)
From (14):
$a_y = (9.82 - V^2/6,370,000)$ m/s$^2$ (for $t<157.05$ seconds)
$a_y = (9.82 + V^2/2,175,000)$ m/s$^2$ (for $157.05 < t < 167.05$ 3 sec.)

V. NET ACCELERATION EXPERIENCE DURING LAUNCH

The vector sum of accelerations normal to the launch tube, and accelerations tangent to the launch tube.

$$a_t = SQR(a^2 + a_y^2) \quad (15)$$

VI. ORBITAL TRAJECTORY CALCULATIONS (See FIG. 8) $1/R_c = d(a-\phi)/dS = -d\phi/dt \cdot 1/V$
(Centripetal Accelerations)

$$\quad (16)$$

$$-F_d - Mg \sin a = M \, dV/dt \quad (17)$$

$$Mg \cos a = MV^2/R_c \quad (18)$$

From (16):

$$MV^2/R_c = -MV \cdot d(a-\phi)/dt = -MV \, d\phi/dt \quad (19)$$

$$V \cos \alpha = h \, d\phi/dt \quad (20)$$

$$V \sin \alpha = dX/dt \quad (21)$$

Equations of Motion (differential form) From (17):

$$dV/dt = -F_d/M - g \sin \alpha \quad (22)$$

From (19):

$$d\phi/dt = -g/V^* \cos \alpha \quad (23)$$

From (20):

$$d\phi/dt = V/h \cos \alpha \quad (24)$$

From (21):

$$dh/dt = V \sin \alpha \quad (25)$$

VII. MODELING THE DYNAMIC PARAMETERS OF FLIGHT $$g = g_o(R_{er})^2/(R_e + X)^2 \quad (26)$$

For X<10 km $T = T_o - (\lambda)(X)$ $\quad (27)$

For 10<X<20 km T=216 degrees kelvin
For T>20 km T=240 degrees kelvin
For X<10 km $$\rho = \rho_o*(1-(\lambda*X/T_o))^{(g/(\lambda*K)-1)} \quad (28)$$

For 10<X<40 km $$\rho = \rho_o*(2.178^{(-g*(X-3265)/(K*T))}) \quad (29)$$

| For 40 < X < 50 | $\rho$ = .005 kg/m$^3$ |
| For 50 < X < 60 | $\rho$ = .001 kg/m$^3$ |
| For 60 < X < 80 | $\rho$ = .0001 kg/m$^3$ |
| For 80 < X < 100 | $\rho$ = .00001 kg/m$^3$ |

VIII. ITERATIVE SOLUTION TO SPACE TRAIN FLIGHT DYNAMICS

Equations 22-29 were solved iteratively using a computer.

From (22):

$$a_{n+1} = -F_{dn+1}/-g_{n+1} \sin(\alpha_{n+1}) \quad (30)$$

$$V_{n+1} = V_n + (a_{n+1} + a_n)/2 \cdot dt \tag{31}$$

From (23):

$$_{n+1} = _n + [-g_{n+1}/V_{n+1} \cdot \cos(_{n+1}+_{n+1}) + [-g_n \cdot \cos(_n+_n)] \cdot dt/2 \tag{32}$$

From (24):

$$_{n+1} = _n + [V_{n+1}/h_{n+1} \cdot \cos(_{n+1}+_n) + V_n/h_n \cdot \cos(_n+_n)] \cdot dt/2 \tag{33}$$

From (25):

$$h_{n+1} + h_n + [V_{n+1} \cdot \sin(_{n+1}+_{n+1}) + V_n \cdot \sin(_n+_n)] \cdot dt/2 \tag{34}$$

IX. SPACE TRAIN SHAPE AND DENSITY $$\rho_s = M/[(\tfrac{2}{3}) \cdot \pi r^2(z_c) + (\pi r^2(z_b)] \tag{35}$$

$$z_c = r/\tan(\delta/2) \tag{36}$$

$$\% \text{ open room on Space Train} = 100 \cdot (1 - \rho_s/\text{density of building material}) \tag{37}$$

Example

M = 3,250,000 kg
$\delta$ = 10 degrees
r = 2.5 meters
$z_b$ = 122.9 meters
Density of building material (iron) = 7,874 kg/m³

From (36):

$z_c = 2.5/\tan(5) = 28.6$ meters

From (35):

$\rho_s = 3,250,000/[(\tfrac{2}{3}) \cdot \pi(2.5)^2(28.6) + (^2(2.5)^2)(122.9)] = 1,165.9$ kg/m³

From (37):

% open room on Space Train = 100 * (1 − 1,165.9/7,874) = 85.2% open room

FIGURE KEY

1. Front 10 degree nose cone
2. Front stabilizing gyroscope
3. Passenger compartment/work/sleep area
4. Shuttle de-orbit vehicle
5. Supplies and building materials
6. Solar/Electric Lepcon ™ Panel Storage
7. Rear stabilizing gyroscope
8. Propulsion Mass to be ejected
9. Electric Mass driver propulsion system
10. Tip of rear cone, ejects to provide exhaust port
19. Launch Tube
20. Space Train ™
21. First Airlock
22. Open-air loading platform
23. Crew compartment
24. Hatch
25. First door of airlock system
26. Second door of airlock system
27. Air evacuation pump
28. Main Vacuum Duct
29. Subsidiary vacuum ducts 29, 29', 29"
30. Electronic Control Module
31. Pull-only Electromagnets (cross-section)
32. Mid-section of launch tube
33. Superconducting Magnetic Storage Ring
34. Power distribution system (bus)
35. Power plants (coal, nuclear, solar)
36. Switching System
39. Upwardly curved end of tube
40. Mountain terrain
41. Second Air Lock System of Launch Tube
42. Main Duct of Air Conduction System
43. Secondary Air Ducts 43, 43', 43", etc.
44. Second Airlock Entrance Door (Third Door)
45. Second Airlock Exit Door (or Thin Membrane) (Fourth Door)
46. Radius vector to Earth's center at start of tube
47. Radius vector to Earth's center at end of tube
48. Radius vector $R_c$ of upward curve near end of tube
49. Inlet Air Conduit
50. Passenger.
51. Cushion Gee chair.
52. Z-axis pivot (computer controlled).
53. Y-axis pivot (computer controlled).
54. Counterweight.
55. Seat belt system.
56. Surface of Earth.
57. Tangent to Earth directly below Space Train.
58. Launch point of Space Train.
59. Optimum point of operation. Lowest mass and exit velocity with the constraint of achieving escape from Earth's gravity and not exceeding 8 gravities deceleration.

"a" placed after a number refers to the "actuator" for the device.

"c" placed after a number refers to a control wire to the device.

"v" placed after a number refers to a valve in the pipe or duct.

DISCUSSION

The acceleration of the Space Train ™ to an exit velocity of 11.8 km/sec. takes place in five phases designed to provide a physiologically tolerable ride during the three minutes of maximal stress. Research indicates that the average human can withstand accelerations up to 12 times that of gravity when that acceleration is directed perpendicular to the chest (denoted here as Gx). Accelerations of greater than 12 Gx are found to interfere with breathing. Accelerations parallel to the chest (denoted here as Gz) are tolerable only up to three times that of gravity since these alter cerebral blood flow and cause blackouts.

Figure 12:
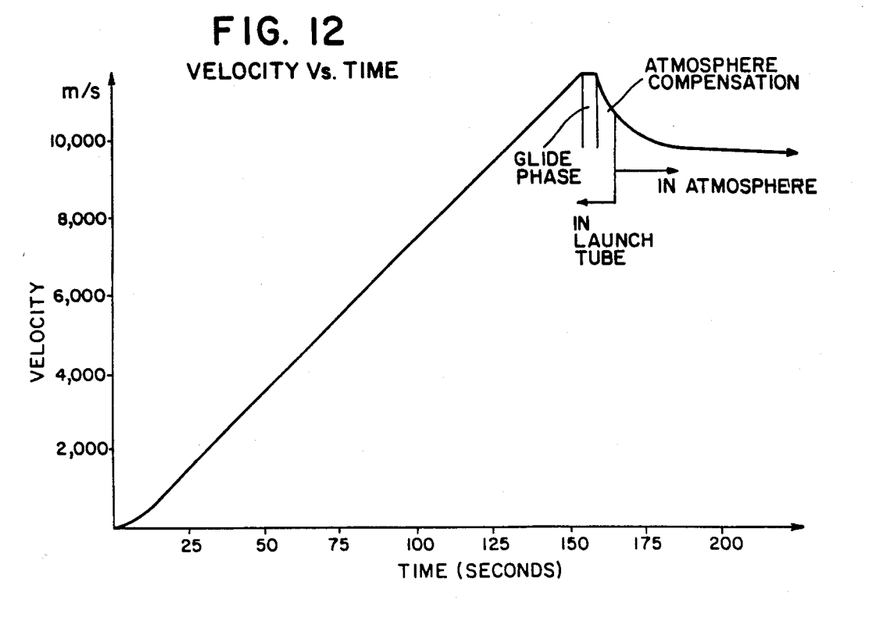
FIG. 12 shows the velocity V vs. time t of the Space Train TM from the start to its exit into the atmosphere.
Figure 13:
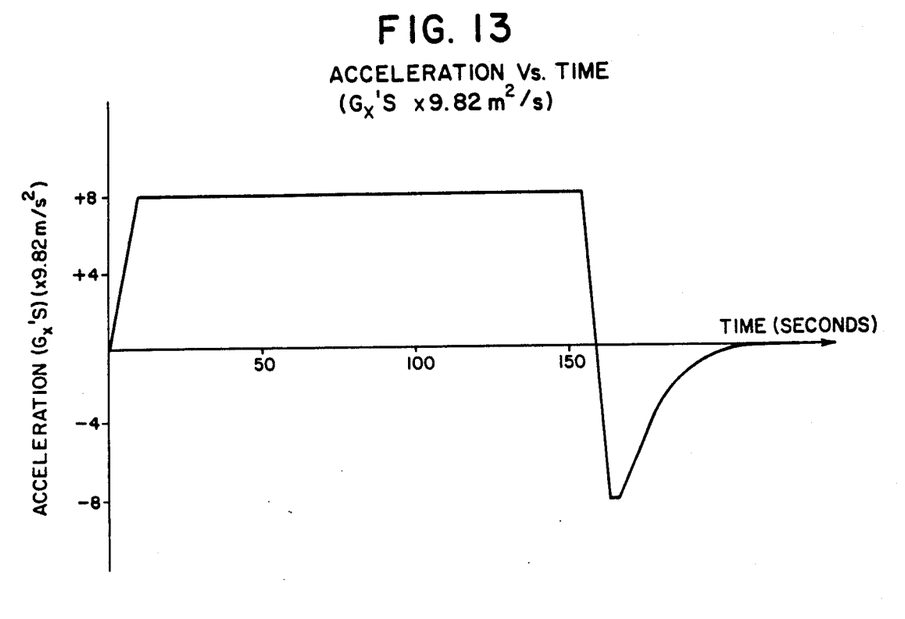
FIG. 13 shows a graph of the Space Train TM Acceleration vs. time indicating the gradual change from acceleration to deceleration near the Tube Exit.

During the Build-up Phase, the ship's acceleration is linearly increased from zero to eight gravities Gx over a period of 10 seconds rather than instantaneously, thus avoiding a sudden jolt to the passenger. The Boost Phase accelerates the Space Train ™ to a final velocity of 12 km/sec. over a period of 146 seconds. The Build-down Phase decreases the acceleration from eight gravities to zero Gx over a three second period. Following, a Glide phase (3 seconds), allows a period of zero acceleration in which the passenger's chairs can be rotated 180 degrees to prepare for the deceleration phase. During the final phase, the Atmospheric Compensation period of time, (up to a density of 0.905 kg/m³) produces a linear increase in the deceleration which peaks at −8 Gx's at the end of the tube causing a change in velocity equal to −190 m/s, and an exit velocity of 11.8 km/sec. at the launch tube exit. The velocity profile of the first 200 seconds is shown in FIG. 12. The Tangential acceleration profile is shown in FIG. 13. The Total acceleration experienced by the passenger is actually greater than this; it is the vector sum of the tangential acceleration (Gx) and the acceleration normal to the Earth (the result of gravity and centripetal acceleration—Equation 14). In the examples calculated in section II, a maximum centripetal acceleration of 4 times gravity was assumed. In the final section of tube (according to equation 14) the total normal acceleration ($a_v$) is 49.1 m/s$^2$ or 5 gravities while at the maximum tangential deceleration is $-8$ Gx. According to equation 15, the total acceleration experienced for the last second in the Launch Tube is approximately 9.45 times the force of gravity (the largest acceleration experienced during the entire flight).

Figure 1:
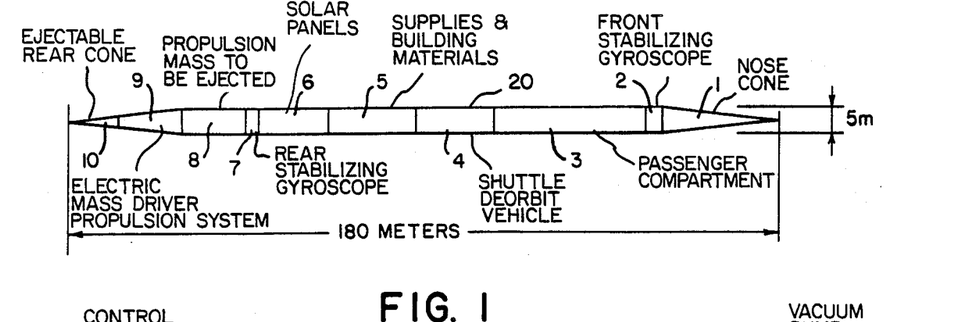
FIG. 1 shows a cross-section of the Space Train TM and a proposed compartmentalization for various purposes.

FIG. 1 shows a cross-section of the Space Train TM indicating the proposed division of interior space. This 180 meter craft contains sufficient room for crew, living and research quarters, a shuttle vehicle for return of the crew, building materials for construction in space and numerous Lepcon TM light/electric power converting panels needed to provide electric power for all uses. The ship also contains an interplanetary mass-driver propulsion system in the rear cone. Front and rear cones were designed with a 10 degree angle to minimize drag. Since the cross-sectional area and cone angle are the critical parameters in equation (6) for drag, the ship can be elongated without a serious increase in drag forces—thus providing additional room if needed.

Figure 2:
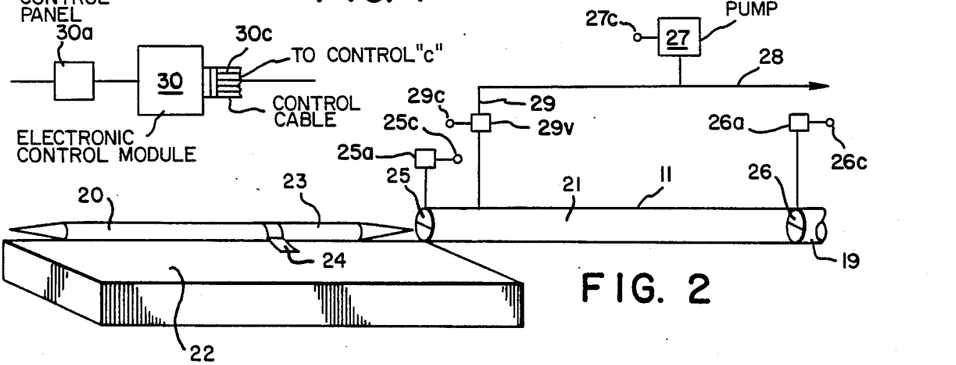
FIG. 2 shows a perspective view of the Space Train TM and Loading Platform at the entrance to the Tube.

The open air loading platform is seen in FIG. 2. Passengers board the Space Train TM without any special suits or training. The ship is next moved into the tube by any suitable conventional means, such as fixed rollers on the ground, and a chain drive into the Launch Tube through the first door 25 of the air lock system 21, in which, the Second Door 26 is closed. The First Door 25 is then closed. The air is evacuated from the air lock 21 by an Air Vacuum Pump 27, through valve 29v, which is controlled by the electronic control module 30 via wire 29c. Only first stage vacuum pumps may be required because a high vacuum is not needed. At 1 millibar residual air pressure, the air friction of the moving vehicle is negligible, 0.1% of atmospheric pressure. At this point, the Second Door 26 of the air lock is opened by its actuator 26a, controlled by wire 26c connected to electronic control module 30, control cable 30c, and the launch is ready to proceed.

Figure 3:
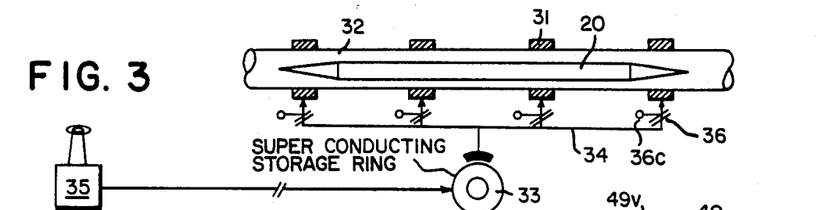
FIG. 3 shows a cross-section of the Space Train TM and Tube at a mid-section of the Tube on the Earth's surface.

FIG. 3 is a cross-section of the Launch Tube and Space Train at some midpoint in the Boost Phase. Here, the "pull only" electromagnets indicate that they do not reverse currents to electromagnetically push the train but only pull it. Referring to FIG. 3, to enable the electromagnets 31 to pull the Space Train TM 20, its hull is made wholly or in part of a magnetic material such as iron; or other known magnetic material. An electric current is applied to the electromagnetic coils 31 just ahead of the center of the vehicle as it advances along the Tube 19. This also provides a self-centering force on the ship. The coils are spaced at predetermined intervals, specified by the ship's speed, required acceleration, and the coils electromagnetic field strength. The electric current is supplied to the coils 31 via the switches 36, which supply power from the inductor 33 via the bus 34. Electric power is provided by conventional sources (coal, nuclear, or solar). The electric power will be pulled off the power grid over a 24 hour period and stored in a series of superconducting storage rings 33, each ring supplying power to one or a group of electromagnets during the course of a launch.

References [8, 9, 10, 11] are incorporated in the specification to teach the known means of carrying out the invention, to describe prior art electromagnetic propulsion devices, and to set forth well known principles which may be employed in the engineering design of the present invention.

Figure 4:
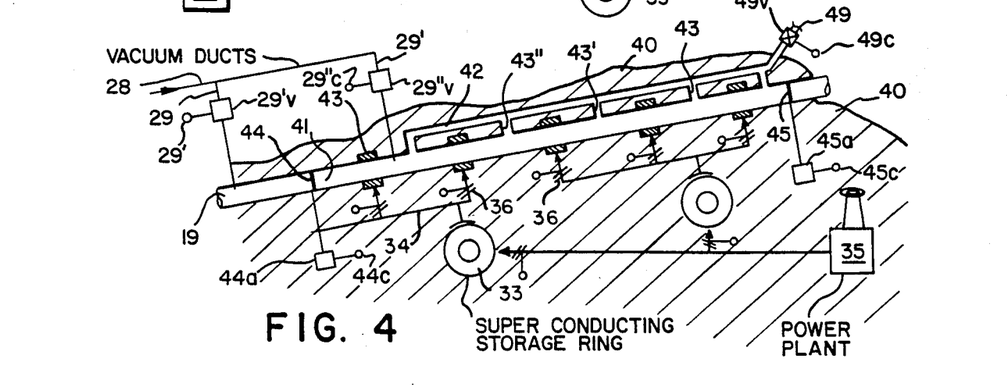
FIG. 4 shows the exit section of the Tube for launching the Space Train TM.

FIG. 4 illustrates the final section of the Launch Tube constructed just under the surface of a suitable terrain and opening into the atmosphere at an altitude of 1-6 km and an angle of 1° to 6°; for example 3 km and 3°. The final section of the tube contains a series of conduits comprising a Main Air Duct 42, and distribution Air Ducts 43, 43', 43'', etc., which channel air from the atmosphere into the evacuated Launch Tube 19. These conduits are opened by valve 49v once the Space Train TM passes the next to last (third) air lock door 44. The atmospheric flow rate is such that the final tube section is completely filled with air in 5 seconds thus providing a smooth transition from zero to negative eight Gx's. At the end of the tube, the Space Train TM passes through the last (open) door 44; or alternatively, breaks through a thin membrane or passes through the last (fourth) Door 45 of the 2nd Airlock 41, which previously sealed the evacuated tube from atmospheric pressure.

Figure 6:
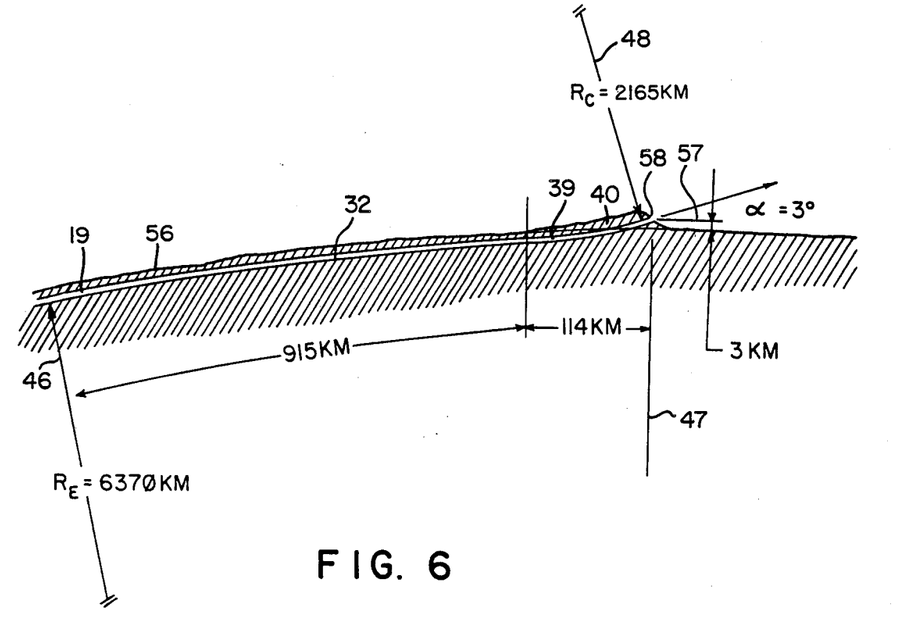
FIG. 6 shows a cross-section of the entire length of the Tube showing the trajectory of the Space Train TM on the Earth's surface.

FIG. 6 shows the entire course of the Launch Tube. The door 45 is opened or closed by its actuator 45a, controlled by wire 45c connected to the electronic control module 30 via cable 30c. In this example, the first 914 km follows the curvature of the Earth ($R_e = 6,370$ km) while the final 114 km curves upward ($R_1 = 2175$ km) to provide a launch height of 3 km, at an angle of 3°.

Figure 7:
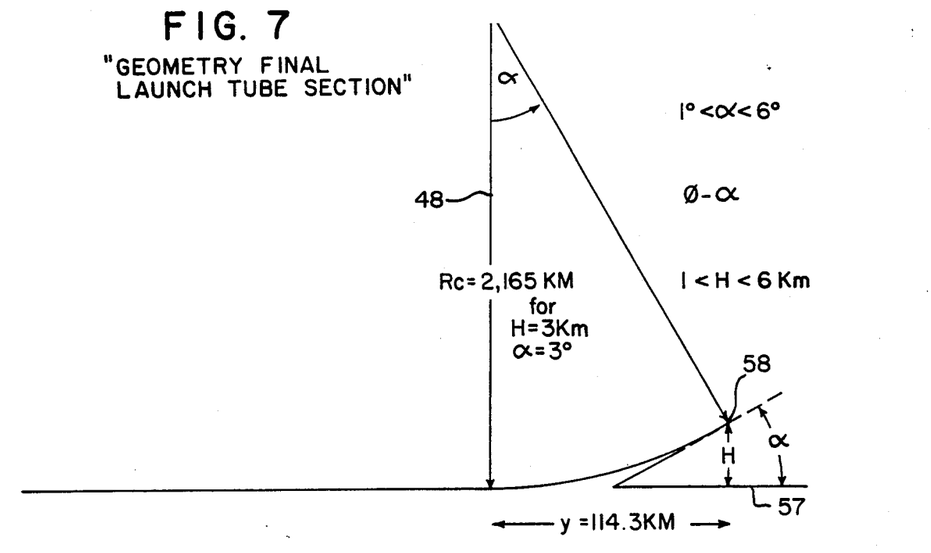
FIG. 7 shows the geometry of the Final Launch Tube Section.

FIG. 7 shows an example of the geometry of the final Launch Tube section indicating the curvatures, section lengths and angles. It is hoped that a mountain with the appropriate west face terrain, able to accommodate such a curvature, can be found in some region near the equator.

Figure 8:
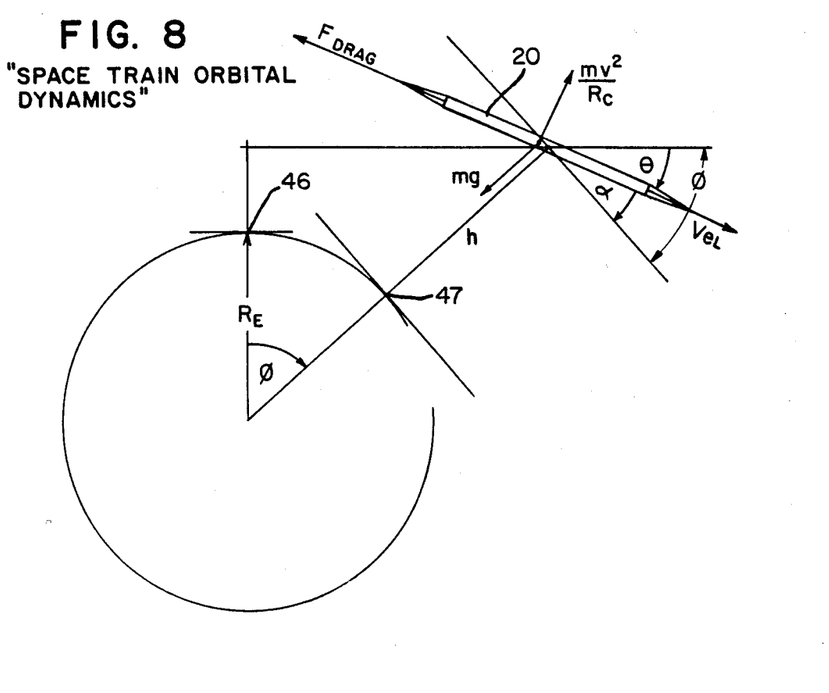
FIG. 8 shows Space Train TM Orbital Dynamics.

The angles and geometry describing the flight path and the equations of the orbital trajectory are defined in FIG. 8. The angle "$\alpha$" is defined as the angle between the velocity vector and the tangent to the surface of the Earth at the launch point.

Figure 9:
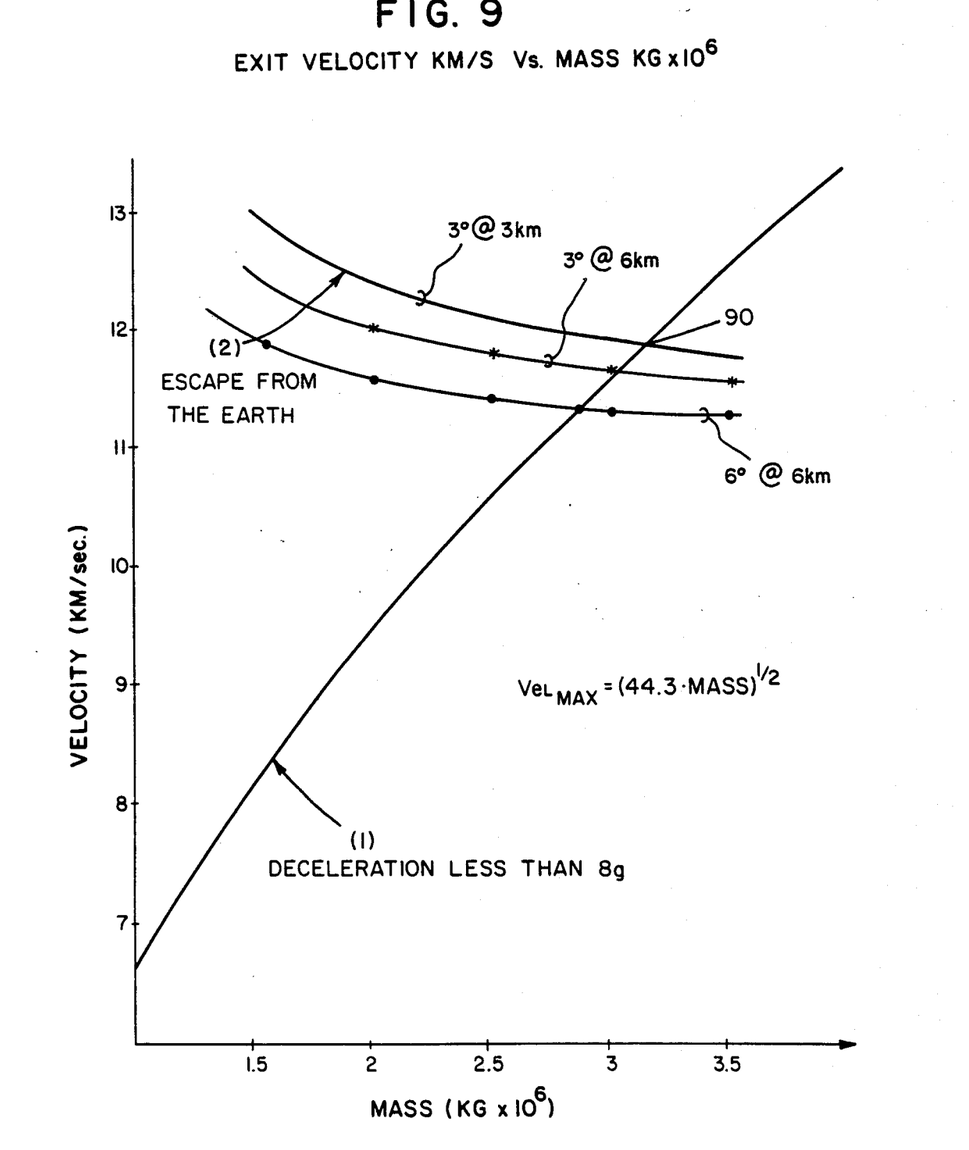
FIG. 9 shows curves of Exit Velocity km/s vs. Mass Kg$\times 10^6$ for:
(1) a maximum deceleration less than 8 gravities.
(2) escape

The Space Train TM mass of 3,250,000 kg and exit velocity of 11.8 km/sec. were chosen using the graphs seen in FIG. 9. The upward sloping curve determines the mass-exit velocity relationship needed to maintain the deceleration of the craft at 8 Gx's. Points below this curve are safe for passengers given the acceleration constraint. The upward sloping curve indicates the exit velocity (for a ship of a particular mass) needed to escape from Earth's gravity well. This curve was generated using the computer simulation of the flight path for vehicles of varying masses and initial velocity. The point of intersection of these two curves represents the minimum mass and minimum velocity needed for the ship to achieve escape velocity without experiencing a deceleration of greater than 8 gravities (Gx's).

The maximum height achieved (apogee) by Space Train is a function which depends primarily on mass, exit velocity and launch angle. FIG. 9 demonstrates that for a given exit velocity, the more massive ship attains a greater apogee. The greater mass allows the ship to store up more kinetic energy and thus loose a smaller percentage of its total energy during it transatmospheric flight. FIG. 10 demonstrates that for a given exit velocity, the greater the launch angle, the greater the apogee reached. In this situation, the greater launch angle decreases the amount of time that the ship spends in the dense atmosphere. Both curves were generated using an iterative computer program. It was assumed during these calculations that the Earth's rotational velocity would contribute approximately 400 m/s additional velocity to the ship.

Figure 14:
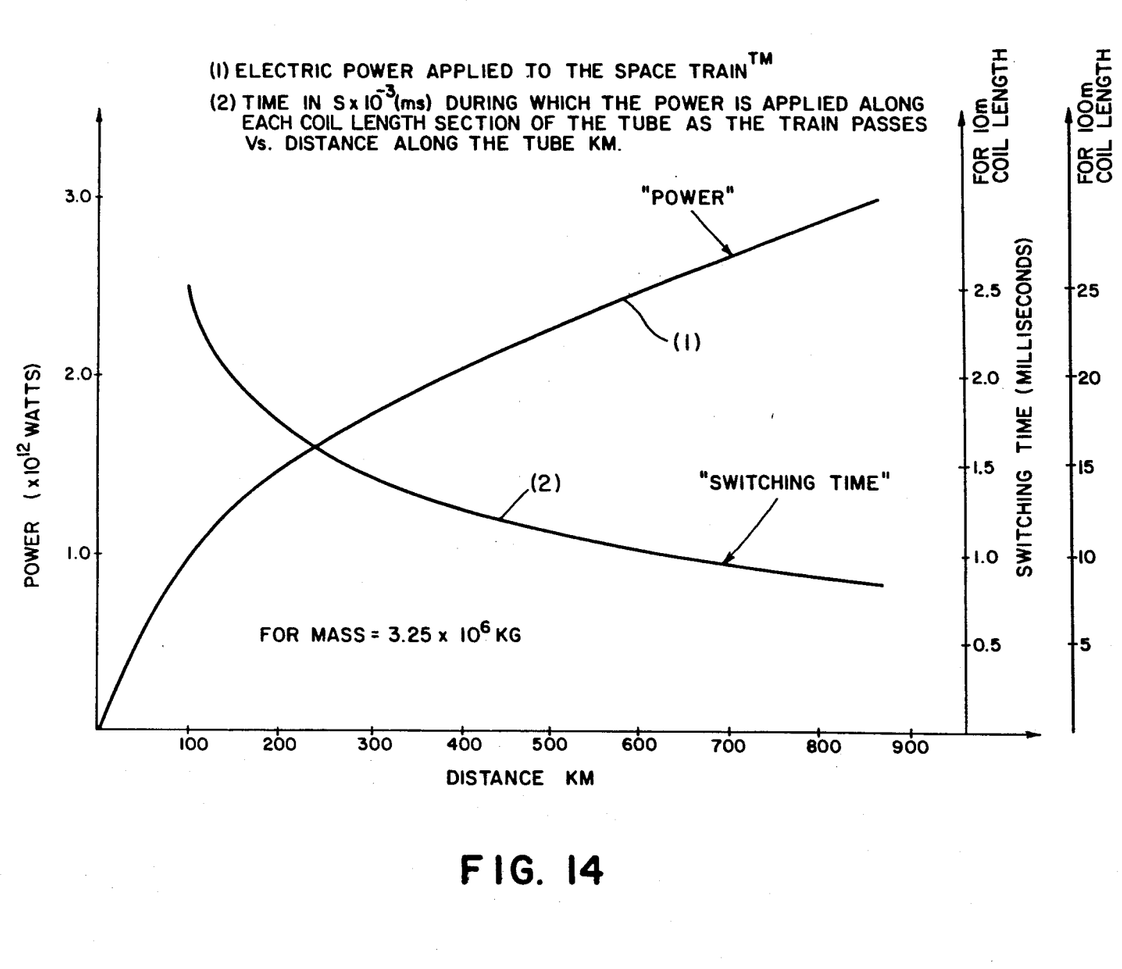
FIG. 14 shows:
(1) electric power applied to the Space Train TM
(2) Time in $S \times 10^{-3}$ (ms) during which the power is applied along each coil length section of the Tube as the Train passes vs. Distance along the Tube KM.

FIG. 14 shows two functions plotted on the same graph: Power vs. Distance and Switching Time vs. Distance. Power here represents the amount of energy need per second to accelerate the 3,250,000 kg Space Train $[P=(M*a)(V)]$. The switching time refers to the amount of time needed for the voltage in the electromagnet coils to rise to their full potential, or conversely, the amount of time needed for the voltage in the coils to fall back to zero. It was assumed that the switch must occur within the time taken for the ship to transverse 10 or 100 meters. The maximum switching time found, approximately 0.8 milliseconds for 10 meters, or 8 ms for 100 meters (at $3*10^{12}$ watts) appears to be within our technological capabilities. A section of the electromagnetic coils, 120 m long, may be simultaneously energized in which case, the maximum switching time is increased to about 10 ms.

DETAILED DESCRIPTION OF THE INVENTION

FIG. 2 shows the electronic control module 30, which comprises a computer keyboard 30a, a computer with program 30, and a cable 30c containing wires connected to various control devices. FIGS. 2 and 3 show vacuum pump 27 connected by the main duct 28 to subsidiary ducts 29, 29', and 29'', having respectively, valves 29v, 29'v and 29''v. Duct 29 is connected to the first airlock 21; duct 29' is connected to the mid-section of the launch tube 32; and duct 29'' is connected to the second airlock 41. The electromagnetic door actuators 25a, 26a, 44a, and 45a respectively open or close airlock doors 25, 26, 44, and 45. Control wires 25c, 26c, 44c and 45c from the door actuators are connected via cable 30c to the electronic control module 30. The air control valve 49a, connected by the wire 49c to the cable 30c, controls the inlet air to the second airlock 41. The air, vacuum and electrical cycles are established by a program in the electronic control module 30, in accordance with the formulae and evaluations set forth herein.

Figure 5:
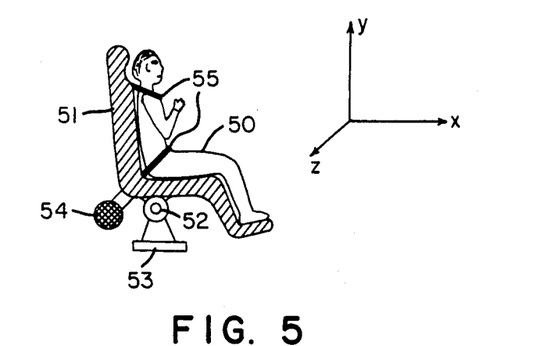
FIG. 5 shows a side view of a passenger in a launch chair located in the Space Train TM.

Referring to FIG. 2, the Space Train TM 20 is initially positioned at an open air Station and Loading Platform 22. It is boarded and cargo loaded through doors 24. The Tube is vacuum-sealed by an Entrance Air-Lock with double doors 25, 26. The journey into space commences as the train is slowly moved into the Air-Lock, the door 25 closed and the Air-Lock evacuated. The door 26 is then opened, and the Train accelerated by the electromagnetic drive coils 31 at 8 g's for 157 sec. (2.6 minutes) to an exit velocity of about 12 km/s. Just before entering the atmosphere there is a 3 sec. period during which the acceleration is zero, providing time for the cushioned g-chair 51, shown in FIG. 5, to automatically revolve 180° about its vertical y axis. To prevent loss of the vacuum in the Tube, the Exit Air-Lock doors 44, 45 are opened and closed to enable the Train to pass. After the Train passes, the door 44 closes, and air enters the Air-Lock through the duct 42 shown in FIG. 4. This enables a gradual change from acceleration to deceleration shown in FIG. 13.

The mass, length and shape of the Train, and the Tube exit height and angle are chosen to minimize the atmospheric drag. Referring to the example shown in FIG. 6, the Tube 61 follows the curvature of the Earth for 915 km; then, to enable the Train to exit from the Tube at an angle of 3° to the horizontal, the Tube curves upward to a 3 km height in a distance of 114 km, at a radius of about 2175 km; such disposition being available naturally by suitably siting the Tube on favorable terrain. The Train may issue into the atmosphere, for example, through a thin "rupturable" disphragm at 45 located at the end of the Tube 61. As the Train enters the Atmosphere the maximum deceleration is 8 g's, quickly decreasing to about 1 g, and to almost 0 g.

The switching system for a space launcher is described in references 8 and 9. The switching time requirements in the switching system in this invention (milliseconds) is considerably greater than the switching time (microseconds), of the prior art reference. This is because of the greater length of the space vehicle in the present invention and hence, greater spacing between the electromagnetic coils. For example, in FIG. 14, Curve No. 2, right hand scale, the switching time of the present invention is 1 to 2.5 ms, which is within the present state of the art of switching devices. The switching of large amounts of electric power is common practice in present electric power plant distribution systems.

About 100,000 m² of Lepcon TM panels will be carried as cargo aboard the vehicle when it is launched. The Lepcon TM panels are about 0.6 cm thick. A package may contain 1000 Lepcon TM panels per m³; and 100m³ of cargo space may be provided on the Train. If the Train is 5 m in diameter and the wall thickness 0.3 m, the internal cross-section is about 15 m². Using about a 75% packing factor, the $10^5$ m² of Lepcon TM panels may be stored as cargo in about 10 m length of the vehicle. Another 10 m length of the vehicle may be used for the construction materials to assemble the Lepcon Solar-Electric power converting Array in space. To provide living and working rooms for the crew on long journeys, outboard structures may be constituted by the assembly in space of building materials carried as cargo; or, by separating and repositioning portions of the Space Train TM. For example, such rooms may be positioned just outside the Solar-Electric Panel Array, and rotated to provide a suitable gravitational field, for example, 1 g, or a variable g in known manner [1].

Once the Space Train TM has passed beyond the Earth's atmosphere the Lepcon TM panels may be deployed as an Array in the form of a disc, which may be for example, circular, having a radius of about 180 m, and an area of 100,000 m².

In the vicinity of the Earth-Sun distance, $1.5 \times 10^{11}$ m, the $10^5$ m² of Lepcon TM Solar-Electric Panel Array will provide 100 Mw Solar-Electric Power to the propulsion system of the Space Train TM, and for other on-board requirements. An excess portion of the electrical energy produced may be stored by suitable electrical storage means; for example, a superconducting electromagnetic ring.

Because of its large mass, a Space Train TM will carry everything needed as cargo and will be self-sufficient on a long voyage. After getting underway, the solar-electric power converting panels will be deployed as a disc; passenger, and crew living and work quarters may be assembled and located on the perimeter of the disc. The entire structure may revolve slowly (about 2 RPM to provide a variable or 1 g gravity and a normal life-sustaining environment). Alternatively, parts of the Space Train TM may be separated like the cars of a train and repositioned in space on the perimeter of the disc.

One or more prefabricated Shuttles may be carried ready for use and separated as needed to land on the Earth, Moon, Mars, etc.

The electrically powered mass-driver propulsion system is herein termed a "Thrustor". The Thrustor provides the force to drive the Train TM in space. The Thrustor electrically accelerates and expels submicron (500–1500 A) particles, charged with one or a few charges per particle. These particles are expelled at the rate of 0.01 to 1 Kg/s, for example, 0.1 Kg/s. These particles are supplied from a certain mass stored as cargo; herein termed "expendable mass".

Expendable mass may comprise finely crushed, dry rock or a suspension of particles in water. The mass expelled may eventually be replaced during an interplanetary voyage from material such as rock mined on the Moon, Mars, Asteroids or other body. Such rock will be finely crushed and converted to submicron particles, for use as expendable mass expelled by the Thrustor.

The Train may include a facility with means to disintegrate expendable mass into submicron particles for use in the Thrustor to provide thrust for the Train.

One such means for disintegrating the finely crushed rock particles may comprise an "Impactor" for the breakup of larger particles into smaller particles. The impactor applies a large impact and liquid shear on particles suspended in water; for example, by directing a high velocity water jet containing the suspended rock particles onto sapphire or tungsten carbide surface on a disc. The water suspension may contain a small percentage of suitable surfactant to maintain the particles in suspension.

The particles may be graded according to size; for example, by an on-board facility employing several centrifugal separations at different RPM's in the range of 3000 to 20,000 RPM. The first separation at 3000 RPM concentrates, on a bottom layer on the centrifuge tube, particles larger than 5 μm, leaving smaller particles in suspension in water in the upper part of the centrifuge tube. Preferably a continuous centrifuge is employed.

A second separation, for example at 5000 RPM, concentrates particles between 0.5 μm and 5 μm, the smaller particle remaining in suspension in the upper portion of the centrifuge tube. This process may be repeated to obtain any size range. For example, at 9000 RPM all particles smaller than 1500 A may remain in suspension. The larger particles are returned to the Impactor for further breakup into smaller sizes, and the process is repeated until all the particles are broken into the required dimensions. The smallest particles, in the range of 500 to 1500 A, remain in suspension by Brownian Motion. These may be concentrated by a greater RPM, for example, 20,000 RPM, for use in the Thrustor. These RPM values are illustrative; other values may be used as determined in practice with suspensions of various materials.

The particle charging device in the Thrustor may comprise a plurality of orifices, for example, about 30 to 100 μm in diameter through which the particle-water suspension is forced forming a plurality of jets. An external ring electrode surrounding the jets applies an electric field to the water-particle jets which break apart and separate the charged particles by mutual repulsion. The water quickly evaporates leaving one or more charges on the particles, which are accelerated by the high voltage in the Thrustor.

An alternate method of forming the submicron particles may comprise the steps of feeding finely crushed rock into a high temperature plasma torch to vaporize, then cool and condense the vapor to form submicron particles in the presence of electrons or ions, thereby producing electrically charged submicron particles about 1000 A dia. with one or a few electric charges per particle. These electrically charged submicron particles are electrically accelerated and expelled by the Thrustor to provide the force to propel the Space Train TM.

Alternatively, an Electric-Light Power Converter (laser) such as the Elcon TM laser beam [3] may be utilized to vaporize the rock particles to form submicron particles by cooling condensation and solidification from the vapor.

Another application of the principles disclosed herein, is rapid ground transportation by train over long distances such as, travelling the 4800 km distance between New York and Los Angeles in one hour; at 1.3 km/s average velocity, and 2.7 km/s peak velocity, at a small maximum acceleration of 0.3 g. With greater acceleration not exceeding 8 g, the travel time could be decreased to about 15 minutes. Because there is no atmospheric entry at high velocity, a vehicle of smaller mass may be employed. During the deceleration phase, most of the kinetic energy of the vehicle may be electromagnetically recovered and stored or used.

It will be understood that the examples given herein, under the heading "Mathematical Physics," are illustrative and may be modified for other design parameters. For example, if the Tube Exit were located on one of Earth's highest plateaus, at a height of about 6 km, the air pressure would be decreased and the exit angle increased. Examples are: H=5.4 km in the Pino Brava Plateau, Bolivia ($P_{atm}$=0.51); H=6 km in the Nepal Himalaya Plateau ($P_{atm}$=0.47). At 6 km height, the exit angle will be about 6°, the Mass of the Space Train will be about 2,800,000 Kg, the length about 160 m; and the energy to accelerate the vehicle to exit velocity will be decreased by about 15%. [17,18]

The theoretical mathematical physics analysis and calculations presented hereinabove are illustrative, and the scope of this invention is not be be limited thereby. Various modifications may be made to this invention without departing from the scope thereof.

For the purposes of the claims the "Space Train TM" described hereinabove is also termed a "vehicle".

REFERENCES

1. PIONEERING THE SPACE FRONTIER
   An Exciting Vision of Our Next Fifty Years in Space.
   REPORT OF THE NATIONAL COMMISSION ON SPACE
   Bibliography p. 203. Published by Bantam Books, Inc.;
   666 Fifth Avenue, New York, NY 10103.
   1.1 pp. 101,112–113.
   1.2 pp. 122–123
   1.3 pp 64, 103–104
   1.4 pp. 103, 122–123
2. U.S. Pat. No. 4,445,050 issued to Alvin M. Marks on Apr. 24, 1984 entitled: Device for the Conversion of Light Power to Electric Power".
3. U.S. patent application Ser. No. 637,405 filed Aug. 3, 1984 entitled: "Femto Diode and Applications" now issued to Alvin M. Marks as U.S. Pat. No. 4,720,642 on Jan. 19, 1988.

4. U.S. Pat. No. 4,206,396 issued to Alvin M. Marks, June 3, 1980 entitled: "Charged Aerosol Generator with Uni-Electrode Source".

5. Cohen, E., ARL 63–88, May 1963.
   "Research on the Electrostatic Generation and Acceleration of Submicron-Size Particles". Space Technology Laboratories, Inc., Redondo Beach, Calif.
   Contract No. AF 33(616)-6775, Project 7116, Task 7116-03. Aeronautical Reserach Laboratories, Office of Aerospace Research, Wright Patterson Air Force Base, Ohio AD427739; Defense Documentation Center for Scientific and Technical Information, Cameron Station, Alexandria, Va.

6. Superconducting Energy Storage for Space Applications; with bibliography: 9 References; Eyssa, Boom and McIntosh Applied Superconductivity Center, University of Wisconsin Madison, Wis. 53706
   Final Report to NASA
   Grant NAG 3-170; Mar. 3, 1981–July 29, 1982.
   Lewis Research Center, 21000 Brookpark Road Cleveland, Ohio 44135

7. THE ANNOTATED JULES VERNE: FROM THE EARTH TO THE MOON AND A TRIP AROUND IT
   Walter James Miller
   Thomas Y. Crowell, Publishers
   10 East 53rd Street, New York, NY 10022

8. AN ELECTROMAGNETIC FIRST STAGE SPACE CARGO LAUNCHER
   H. Kolm, P. Mongeau, O, Fitch, F. Williams, P. Granau, K. McKinney.
   American Institute of Aeronautics and Astronautics, Inc., 1981.

9. ELECTROMAGNETIC LAUNCHERS
   H. Kolm, P. Mongeau, F. Williams
   IEEE Transactions on Magnetics;
   Vol. MAG-16, No. 5, September 1980

10. DYNAMICS AND DESIGN OF ELECTROMAGNETIC MASS DRIVERS
    III P. 85-157 incl.; NASA SP-428, 1979
    SPACE AND SPACE RESOURCES
    Scientific and Technical Information Branch, Washington, D.C.

11. INTERNATIONAL CONFERENCE ON MAGLEV AND LINEAR DRIVES
    May 14–16, 1986, Vancouver, B.C., Canada; 35 Papers Sponsored by: IEEE Vehicular Technology Society Co-sponsored by: Transportation Development Centre, Transport, Canada; Canadian Institute of Guided Ground Transport, Queens University
    Published by: IEEE, Catalogue No. 86CH22376-4

12. MAGNETIC TRAINS TAKE OFF
    Randall Black, Science Digest, p. 26, August 1984.

13. Ventilatory Response to Forward Acceleration
    Zechman Cherniak and Hyude
    Chronic Acceleleration Laboratory
    Acceleration Section, Biophysics Branch
    Aerospace Medicine Laboratory
    Wright Patterson Air Force Base, Ohio
    Journal of Applied Physiology, Vol. 15:2 pp. 907–910, 1960

14. Decreases in Arterial Oxygen Saturation and Associated Changes in Pressures and Roentgenographic Appearance of the Thorax During Forward ($+G_x$) Acceleration
    Nolan, Marshall, Cronin, Sutterer, and Wood
    Chronic Acceleration Laboratory
    Aerospace Medicine, Vol. 34, p. 797, September 1963

15. A FEASIBLE UTILITY SCALE SUPERCONDUCTING MAGNETIC ENERGY STORAGE PLANT
    Lloyd, Schoenung and Nakamura, Bechtel Inc. San Franscisco, CA; Lieurance and Hilal, General Dynamics Corp., San Diego, CA; J. D. Rogers, Los Alamos National Laboratory, Los Alamos, NM; J. R. Purcell, G.A. Technologies, Inc., San Diego, CA; W. V. Hassenzahl, Lawrence Berkeley Laboratory, Berkeley, CA.
    IEEE Transactions on Energy Conversion, Vol. EC-1, No. 4, December 1986, pp. 63–68, with 10 references.

16. SUPERHARD TRANSPARENT COATINGS
    USARTL-TR-78-19, June 1978.
    Final report for the period November 1975–February 1977.
    Robert L. Fogarty, Richard S. Hassard, John Uram Jr., Glenn Wintermute.
    Goodyear Aerospace Corporation, Arizona Division, Litchfield Park, Ariz. 85340.
    Prepared for: Applied Technology Laboratory, U.S. Army Research and Technology Laboratories (AVRADCOM), Fort Eustice, VA 23604.
    ALUMINA-WATER SUSPENSION, pp. 16–17.
    SUBMICRON PARTICLE SUSPENSIONS
    Graphs of the particle parameters: size, time, rpm of centrifuge are shown in FIGS. 13, 14 and 15, pp. 52–58. Tables 13, p. 54 and B1, p. 103.
    EQUIPMENT; Appendix D, FIG. D-1, p. 109 shows photo of Gaulin Submicron Disperser; FIG. D-2, p. 110 shows photo of Sorvall SS-3 Centrifuge.

17. Encyc. Brit., 1968 Ed., Articles on Bolivia and Nepal.

18. Handbook of Physics and Chemistry, 65th Ed., F 151, Values of Atmospheric Pressure vs. Height.

Having fully described our invention, what we wish to claim is:

1. A system for projecting a Vehicle into space, comprising a Tube having a total length $D_T$ such that $500 \text{ km} < D_t < 1500 \text{ km}$, and an inside diameter d of about 5 m, an entrance port and an exit port on said Tube, Airlocks at each of said ports, the axis of said Tube being parallel to to the surface of the earth for a distance $D_1$, such that $450 \text{ km} < D_1 < 1250 \text{ km}$, and curving upward with a radius $R_c$ such that $1000 \text{ km} < R_c < 3000 \text{ km}$ for a distance of $D_2$ such that $40 \text{ km} < D_2 < 240 \text{ km}$, the exit to said Tube being located at a height H such that $1 \text{ km} < H < 6 \text{ km}$, and an angle $\alpha$ to the horizontal such that $1° < \alpha < 6°$, a Vehicle in said Tube, a first means comprising coils mounted along said Tube, a second means mounted on said Vehicle, an external electric power source, a third means for storing electric energy from said power source, a fourth means along said Tube to supply electric power from said third means to said first means to provide an electromagnetic field travelling along said Tube, said first and second means producing electromagnetic forces which levitate and accelerate said Vehicle, electronic control means, a vacuum pump, ducts and valves connecting said vacuum pump with said Tube and each of said Airlocks, said vacuum pump evacuating said Tube and said Airlocks, each said Airlock comprising at least two doors, electromechanical actuating means on said doors, signals from said control means to said actuating means to control the opening and closing of said doors, said doors opening as the Vehicle approaches and closing after said Vehicle has passed, said Tube having a residual air pressure due to a partial vacuum in which the aerodynamic drag on the said Vehicle is less than 1% of the drag said Vehicle would encounter at 1 Atmosphere at the same velocity, said Vehicle having such mass and velocity at said exit port to enable its escape from earth into space.

2. A system for projecting a Vehicle into Space according to claim 1 in which said first means is a plurality of spaced cylindrically shaped adjacent conductive metal coils surrounding and along said tube and coaxial therewith.

3. A system for projecting a Vehicle into Space according to claim 1, said Vehicle having a maximum acceleration tolerable to humans of about 8 g's; where $g=9.82$ m/s$^2$, air ducts communicating between the atmosphere and the said second airlock, a valve in said air duct controlled by said control means to admit air to said second airlock to increase the air pressure in said second airlock as the said Vehicle approaches the exit to the atmosphere, whereby the maximum deceleration of the said Vehicle as it enters the atmosphere is 8 g.

4. A system for projecting a Vehicle into Space according to claim 1 in which said second means is a magnetic material.

5. A system for projecting a Vehicle into Space according to claim 4 in which said magnetic material is substantially iron.

6. A system for projecting a Vehicle into Space according to claim 1, in which said second means is an electrically conductive coil.

7. A system for projecting a Vehicle into Space according to claim 1 in which said first and said second means comprise a Maglev drive.

8. A system for projecting a Vehicle into Space according to claim 7 in which said drive comprises a linear induction motor.

9. A system for projecting a vehicle into Space according to claim 1 in which the said third means is a plurality of inductors at ambient temperature.

10. A system for projecting a vehicle into Space according to claim 1 in which the said third means is a plurality of capacitors at ambient temperature.

11. A system for projecting a vehicle into Space according to claim 1 in which the said third means is a plurality of superconducting storage rings.

12. A system for projecting a vehicle into Space according to claim 1, a rupturable membrane, the exit to said tube being covered with said rupturable membrane.

13. In a system for projecting a Vehicle into Space according to claim 1, said Vehicle having a length of 120 to 180 m, and a length to diameter ratio of at least 24, the forward and rear ends of said Vehicle having conical shapes with an apex angle of about 10°.

* * * * *